US012746547B2

(12) United States Patent
Denison et al.

(10) Patent No.: US 12,746,547 B2
(45) Date of Patent: Sep. 29, 2026

(54) MICROFLUIDIC DEVICE CHAMBER PILLARS

(71) Applicant: Hewlett-Packard Development Company, L.P., Spring, TX (US)

(72) Inventors: Carson Denison, Corvallis, OR (US); Erik D. Torniainen, Corvallis, OR (US); Richard W. Seaver, Corvallis, OR (US); Pavel Kornilovich, Corvallis, OR (US); Alexander Govyadinov, Corvallis, OR (US); Anand Samuel Jebakumar, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 629 days.

(21) Appl. No.: 18/272,792

(22) PCT Filed: Jan. 22, 2021

(86) PCT No.: PCT/US2021/014591

§ 371 (c)(1),
(2) Date: Jul. 17, 2023

(87) PCT Pub. No.: WO2022/159097

PCT Pub. Date: Jul. 28, 2022

(65) Prior Publication Data

US 2024/0082839 A1 Mar. 14, 2024

(51) Int. Cl.
*B01L 3/00* (2006.01)

(52) U.S. Cl.
CPC . *B01L 3/502746* (2013.01); *B01L 2200/0642* (2013.01); *B01L 2200/0684* (2013.01);
(Continued)

(58) Field of Classification Search
CPC ....... B01L 3/502746; B01L 2200/0642; B01L 2200/0684; B01L 2300/0848;
(Continued)

(56) References Cited

U.S. PATENT DOCUMENTS 5,427,663 A * 6/1995 Austin ............ G01N 27/44791 209/127.1
5,837,115 A 11/1998 Austin et al.
(Continued)

FOREIGN PATENT DOCUMENTS

CN 1715932 B 4/2012
CN 203525731 U 4/2014
(Continued)

OTHER PUBLICATIONS

Hayes et al, Pulsatory Mixing of Laminar Flow Using Subble-Driven Micro-Pumps, Proceedin is of the ASME 2018 International Mechanical Engineering Congress and Exposition, IMECE2018-86937, Nov. 9-15, 2018, Pittsburgh, USA, 8 pages.
(Continued)

*Primary Examiner* — Brian J. Sines
(74) *Attorney, Agent, or Firm* — Foley & Lardner LLP

(57) ABSTRACT

A microfluidic device includes a chamber having sidewalls, a floor, a ceiling, and an inlet. The microfluidic device includes pillars extending from the floor to the ceiling of the chamber. Each pillar has an orientation relative to the inlet defined by a leading surface and a trailing corner opposite the leading corner. The trailing corner has an angle less than a threshold angle that is based on a fluidic contact angle. The orientations of the pillars relative to the inlet promote fluid flow from the inlet throughout the chamber without trapping gas at the sidewalls of the chamber.

13 Claims, 5 Drawing Sheets

(52) U.S. Cl.
CPC .................. *B01L 2300/0848* (2013.01); *B01L 2300/0874* (2013.01); *B01L 2400/086* (2013.01)

(58) Field of Classification Search
CPC ....... B01L 2300/0874; B01L 2400/086; B01L 2200/025; B01L 2200/0621; B01L 2400/0406; C12M 23/16
See application file for complete search history.

(56) References Cited

U.S. PATENT DOCUMENTS

| | | | |
|---|---|---|---|
| 7,686,029 | B2 | 3/2010 | Nakao |
| 8,475,626 | B2 | 7/2013 | Rops et al. |
| 9,174,182 | B2 | 11/2015 | Wimberger-Friedl et al. |
| 9,771,553 | B2 | 9/2017 | Vulto et al. |
| 9,822,890 | B2 | 11/2017 | Juncker et al. |
| 2008/0259720 | A1 | 10/2008 | Lam et al. |
| 2010/0089529 | A1 | 4/2010 | Barholm-Hansen et al. |
| 2011/0079552 | A1 * | 4/2011 | Yagi .................. B01L 3/502753 210/456 |
| 2011/0086427 | A1 | 4/2011 | Faris et al. |
| 2015/0119280 | A1 | 4/2015 | Srinivas et al. |
| 2015/0196909 | A1 | 7/2015 | Jones et al. |
| 2016/0136642 | A1 | 5/2016 | Eriksen et al. |
| 2016/0136643 | A1 | 5/2016 | Larson |
| 2016/0228873 | A1 | 8/2016 | Govyadinov et al. |
| 2016/0272934 | A1 | 9/2016 | Chander et al. |
| 2016/0279637 | A1 | 9/2016 | Sarioglu et al. |
| 2017/0333900 | A1 | 11/2017 | Grisham et al. |
| 2017/0355945 | A1 | 12/2017 | Kamm et al. |
| 2018/0029032 | A1 | 2/2018 | Govyadinov et al. |
| 2018/0272340 | A1 | 9/2018 | Govyadinov et al. |
| 2019/0060898 | A1 | 2/2019 | Mourey et al. |
| 2019/0226953 | A1 * | 7/2019 | Wunsch ............ B01L 3/502746 |
| 2020/0139408 | A1 | 5/2020 | Ito |
| 2020/0191796 | A1 | 6/2020 | Mack et al. |
| 2020/0254407 | A1 | 8/2020 | Wilson et al. |
| 2021/0245155 | A1 | 8/2021 | Dittus et al. |
| 2022/0135399 | A1 | 5/2022 | Puebla Hellmann et al. |

FOREIGN PATENT DOCUMENTS

| | | | |
|---|---|---|---|
| CN | 107824105 | A | 3/2018 |
| CN | 209906795 | U | 1/2020 |
| EP | 1416303 | A2 | 5/2004 |
| EP | 3675876 | A1 | 7/2020 |
| EP | 3862090 | A1 | 8/2021 |
| JP | 2011-072989 | A | 4/2011 |
| JP | 2021-512310 | A | 5/2021 |
| WO | 2008/024070 | A1 | 2/2008 |
| WO | 2014/046687 | A1 | 3/2014 |
| WO | 2014/206420 | A1 | 12/2014 |
| WO | 2014/207257 | A1 | 12/2014 |
| WO | 2016/051272 | A1 | 4/2016 |
| WO | 2019/046052 | A1 | 3/2019 |
| WO | 2020/013915 | A1 | 1/2020 |
| WO | 2021/247750 | A1 | 12/2021 |
| WO | 2022/159097 | A1 | 7/2022 |

OTHER PUBLICATIONS

Huang et aL, Tile implementation of a thermal bubble actuated microfluidic chip with microvalve, micropump and micromixer, Sensors and Actuators A: Physical 210, 2014, pp. 147-156.

Pompano et aL, "Control of Initiation, Rate, and Routing of Spontaneous Capillary-Driven Flow of Liquid Droplets through Microfluidic Channels on SlipChip", Langmuir, vol. 28, Jan. 10, 2012, pp. 1931-1941.

* cited by examiner

MICROFLUIDIC DEVICE CHAMBER PILLARS

CROSS-REFERENCE TO RELATED APPLICATIONS

This application is a U.S. National Stage Patent Application under 35 U.S.C. § 371 of PCT/US2021/014591, filed Jan. 22, 2021, which is hereby incorporated by reference in its entirety.

BACKGROUND

Microfluidic devices leverage the physical and chemical properties of liquids and gases at a small scale, such as at a sub-millimeter scale. Microfluidic devices geometrically constrain fluids to precisely control and manipulate the fluids for a wide variety of different applications. Such applications can include digital microfluidic (DMF) and DNA applications, single cell applications, as well as applications as varied as lab-on-a-chip, inkjet, microreactors, electrophoresis, capacitance sensing, fluidic heat sink, and fluidic sensor probe applications, among other applications.

DETAILED DESCRIPTION

Microfluidic devices often include channels and chambers. Fluid may passively or actively flow from a channel to a chamber to which the channel is directly fluidically connected at an inlet of the chamber. Active fluid flow results when external forces, such as due to microfluidic pumps, assist the flow of fluid. By comparison, passive fluid flow results when no such external forces assist the flow of fluid, and instead capillary and other forces resulting from the interaction of the fluid and the material from which the microfluidic device is fabricated cause the flow of fluid.

When a chamber is initially empty of fluid and instead contains air or other gas, causing fluid to initially flow into and throughout the chamber is referred to as priming. Priming may fail, however. For instance, the initial capillary and other forces may be insufficient for the fluid to flow much past the inlet of the chamber at which the channel is directly fluidically connected, which is a phenomenon referred to as pinning. Furthermore, even if pinning does not occur, the flow of fluid throughout the chamber may be incomplete. Specifically, the fluid may trap air or other gas pockets at sidewalls of the chamber, including at the chamber's corners.

A microfluidic device is described herein that ameliorates these and other issues that can occur during priming. The microfluidic device includes pillars within a chamber having an inlet. Each pillar has an orientation relative to the inlet defined by a leading surface and an opposite, trailing corner. The trailing corner has an angle less than a threshold angle that is based on a fluidic contact angle. As such, each pillar serves to pull fluid in the direction along which it is oriented. The orientations of the pillars relative to the inlet therefore promote fluid flow from the inlet throughout the chamber without trapping air or other gas at sidewalls of the chamber.

Figure 1A:
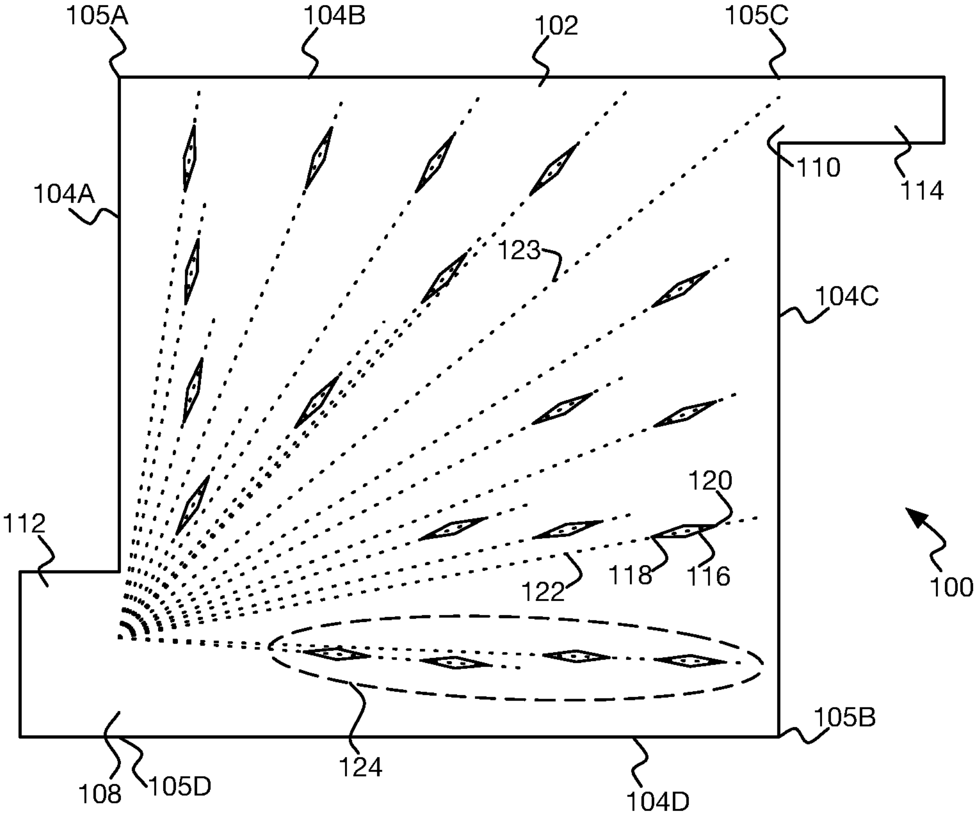
FIGS. 1A and 1B are a cross-sectional top view diagram and a front view diagram, respectively, of an example microfluidic device with chamber pillars that promote fluid flow throughout the chamber.
Figure 1B:
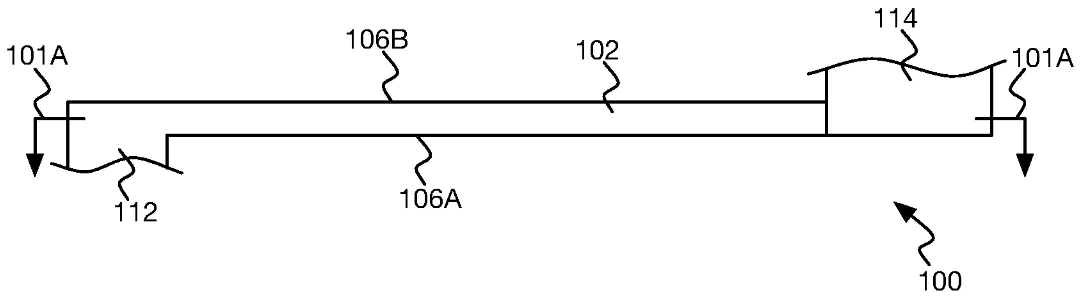

FIGS. 1A and 1B show an example microfluidic device 100. FIG. 1A is a cross-sectional top view of the device 100 at the cross-sectional arrows 101A of the front view of FIG. 1B. The microfluidic device 100 includes a chamber 102 having sidewalls 104A, 104B, 104C, and 104D, which are collectively referred to as the sidewalls 104. The chamber 102 also has corners 105A, 105B, 105C, and 105D, which are collectively referred to as the corners 105. Whereas in the example the chamber 102 is rectangular in shape, has four sidewalls 104, and has four corners 105, in other implementations the chamber 102 may have a non-rectangular shape, may have more or fewer sidewalls 104, and/or may have more or fewer corners 105.

The corner 105A is where the sidewalls 104A and 104B meet, and the corner 105B is where the sidewalls 104C and 104D meet. The corner 105C is where the sidewall 104C would meet the sidewall 104B if it were extended further linearly upwards in FIG. 1A. The corner 105D is where the sidewall 104A would meet the sidewall 104D if it were extended linearly downwards in FIG. 1A.

The chamber 102 of the microfluidic device 100 further has a floor 106A and a ceiling 106B. The chamber 102 has an inlet 108 at a bottom of the sidewall 104A. The inlet 108 is fluidically connected to a channel 112 and thus defines the junction between the chamber 102 and the channel 112. Fluid flowing from the channel 112 enters the chamber 102 at the inlet 108. The chamber 102 has an outlet 110 at a top of the sidewall 104C and opposite the inlet 108. The outlet 110 is fluidically connected to another channel 114 and thus defines the junction between the chamber 102 and the channel 114. Fluid in the chamber 102 exits the chamber 102 at the outlet 110. Whereas in the example the chamber 102 has one inlet 108 and one outlet 110, in other implementations the chamber 102 may have more inlets 108 fluidically connected to the same or different channel(s) 112, and/or more or no inlets 108 fluidically connected to the same or different channel(s) 114. Furthermore, the inlet 108 and/or the outlet 110 may be located at the floor 106A or the ceiling 106B. The inlet 108 and the outlet 110 may also be located at the same surface of the chamber 102 (i.e., any sidewall 104, the floor 106A, or the ceiling 106B).

The microfluidic device 100 has pillars 116 that each extend from the floor 106A to the ceiling 106B of the chamber 102. In the example of FIGS. 1A and 1B, each pillar 116 specifically has a leading corner 118 and an opposite, trailing corner 120 that define the orientation of the pillar 116 relative to the inlet 108. The leading corner 118 is more generally a leading surface, and may be flat or rounded instead of a corner. The leading corner 118 of each pillar 116 is closer to the inlet 108 than the trailing corner 120 is. The shape of the pillars 116 is described in more detail later in the detailed description, and serves to pull fluid in the direction along which the pillars 116 are oriented. However, in the example of FIGS. 1A and 1B, each pillar 116 can be convex quadrilateral in shape. A convex quadrilateral is a four-sided polygon that has interior angles that measure less than 180 degrees each.

In general, the orientations of the pillars 116 are configured to promote fluid flow throughout the chamber 102 from the inlet 108 to the outlet 110 without trapping air or other gas at the sidewalls 104 of the chamber 102, including at the corners 105. That is, the pillars 116 are oriented to prevent fluid from pinning near the inlet 108 during priming, and to ensure that fluid completely fills the chamber 102 without creating any air or other gas pockets. Because the shape of each pillar 116 pulls fluid in the direction along which the pillar 116 is oriented, the pillars 116 can be suitably configured in this manner. Furthermore, the orientations of the pillars 116 promote fluid flow throughout the chamber 102 without the fluid becoming pinned at any pillar 116.

In the example, the pillars 116 are each aligned along a corresponding ray 122 extending outwards from the inlet 108, which has been identified as one way by which the orientations of the pillars 116 can be configured to promote fluid flow during priming without fluidic pinning or trapping of air or other gas pockets when the pillars 116 are suitably shaped. That is, in the example, the orientations of the pillars 116 relative to the inlet 108 are radially aligned with the inlet 108. While each pillar 116 is aligned along a corresponding ray 122, multiple pillars 116 may be aligned along any given ray 122. In the example, no pillars 116 are oriented along the most direct fluidic path between the inlet 108 and the outlet 110. That is, no pillars 116 are aligned along rays, such as the ray 123, between the inlet 108 and the outlet 110.

The pillars 116 thus promote fluid flow towards sidewalls 104B and 104C opposing and not directly adjacent to the inlet 108. Such fluid direction ensures that fluid fans out completely throughout the chamber 102 during priming, and is not primarily contained along the most direct fluidic path between the inlet 108 and the outlet 110, which would result in air or other gas pockets to become trapped at the sidewalls 104. (It is noted, though, that capillary forces induced by the floor 106A and the ceiling 106B will continue to promote fluid along the ray 123, albeit to a lesser extent than along other rays 122 at which pillars 116 are present.)

Some of the pillars 116 promote fluid flow towards the corners 105A and 105B, to ensure that no air or other gas pockets become trapped at the corners 105A and 105B during priming. For example, the pillars 116 within the subset 124 are aligned towards the corner 105B to promote fluid flow from the inlet 108 towards the corner 105B. The sidewall 104D adjacent to the inlet 108 meets the sidewall 104C at the corner 105B. Stated another way, the sidewall 104C adjacent to the outlet 110 meets the sidewall 104D at the corner 105B.

The pillars 116 may already be present to ensure that the ceiling 106B of the chamber 102 does not collapse or bow due to the size of the area of the chamber 102 defined by the perimeter of the sidewalls 104. The pillars 116 in this case are therefore shaped and orientated to also promote fluid flow completely throughout the chamber 102 during priming. However, the microfluidic device 100 may include the pillars 116 even if collapse or bowing of the ceiling 106B is not a concern, in which case the pillars 116 serve just to promote fluid flow.

The number of pillars 116 may be dictated by the number that is sufficient to ensure that the ceiling 106B of the chamber 102 does not collapse or bow, where such collapse or bowing is a concern. However, there may be more pillars 116 than the minimum number that prevents collapse or bowing of the ceiling 106B. Similarly, the location of each pillar 116 may be partially dictated by collapse or bowing concerns, but is also dictated by where the pillars 116 should be located to prevent fluidic pinning and the formation of air or other gas pockets during priming of the chamber 102. The pillars 116 may be asymmetric in their spatial positioning within the chamber 102, as in the example, or may be symmetric. For example, the pillars 116 may be spatially symmetric to either side of the central ray 123 extending from the inlet 108 to the outlet 110. Furthermore, the pillars 116 can be differently sized, even if they have the same shape.

Figure 2A:
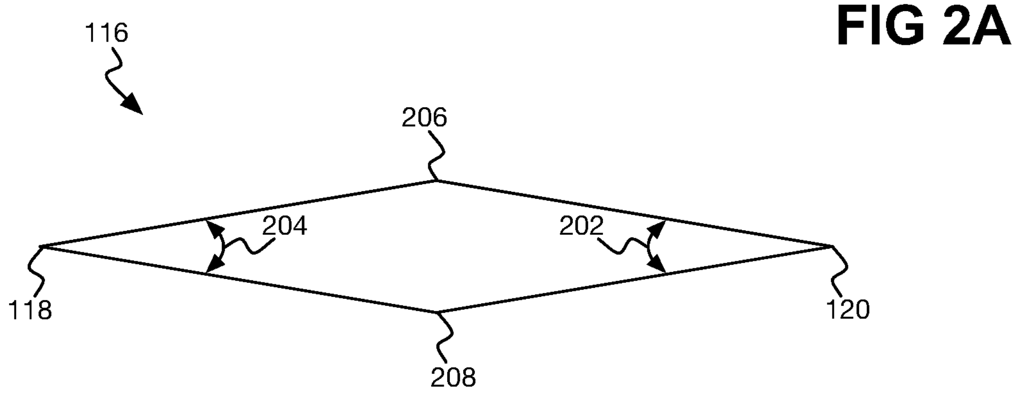
FIGS. 2A, 2B, 2C, 2D, 2E, 2F, and 2G are diagrams of different example chamber pillars that promote fluid flow.
Figure 2B:
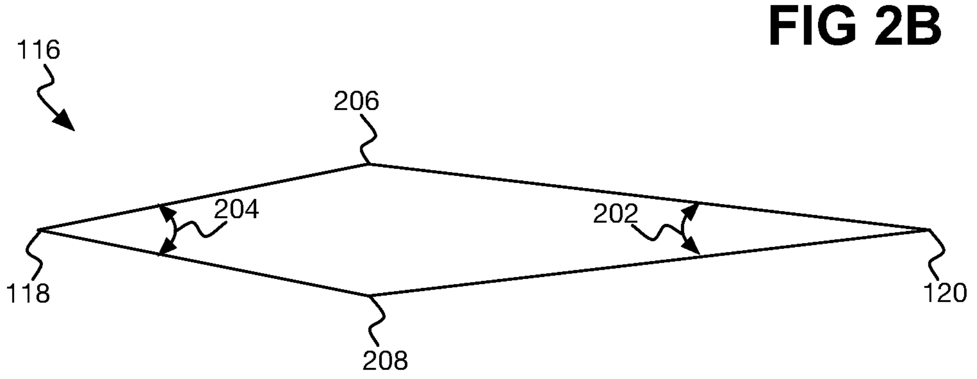

FIGS. 2A and 2B show different examples of the chamber pillar 116 that promote fluid flow, and which may be used in the example microfluidic device 100. The pillar 116 has an internal angle 202 at the trailing corner 120 and an internal angle 204 at the leading corner 118, which as noted above is more generally a leading surface. It is therefore said that the trailing corner 120 has the angle 202 and the leading corner 118 has the angle 204. Also identified in FIGS. 2A and 2B are what are referred to as opposing side corners 206 and 208.

The angle 202 of the trailing corner 120 is less than a threshold angle that is based on the fluidic contact angle, which is the contact angle of the liquid fluid that is to flow throughout the chamber 102 of the microfluidic device 100. The fluidic contact angle is the angle where a liquid-vapor interface of the fluid meets a solid surface, such as the sidewalls 104 of the chamber 102, and can be measured from the solid surface through the fluid. The fluidic contact angle is thus dependent on the material of the sidewalls 104 (i.e., the material from which the microfluidic device 100 is fabricated) and on the gas that fluidic priming displaces from the chamber 102 (e.g., air), in addition to the liquid fluid itself. The fluidic contact angle is also dependent on temperature and pressure.

The threshold angle is specifically equal to two times the difference between 90 degrees and the fluidic contact angle. That is, if the fluidic contact angle is FCA, then the threshold angle CA=2×(90−FCA). For example, for water on SU-8 epoxy negative photoresist, the fluidic contact angle is approximately 80 degrees at room temperature and atmospheric pressure. Therefore, the threshold angle in such implementations can be specified as 20 degrees.

In the examples of both FIGS. 2A and 2B, the angle 202 of the trailing corner 120 of the pillar 116 is less than a threshold angle of 20 degrees. The angle 202 of the trailing corner 120 being less than the threshold angle causes the pillar 116 to pull fluid at the leading corner 118 along the edges of the pillar 116 towards the trailing corner 120. The angle 202 of the trailing corner 120 is specifically smaller in FIG. 2B than in FIG. 2A, where in FIG. 2A the angle 202 is slightly less than 20 degrees. The smaller the angle 202, the greater the fluid-pulling properties of the pillar 116. Therefore, the pillar 116 pulls the fluid more in the example of FIG. 2B than in the example of FIG. 2A.

The angle 204 of the leading corner 118 can be equal to or different than the angle 202 of the trailing corner 120. The angle 204 is equal to the angle 202 in the example of FIG. 2A, and in the example of FIG. 2B is equal to the threshold angle, or 20 degrees, and thus different than the angle 202. The angle 204 can be greater than the threshold angle as well.

To promote fluid flow when oriented per the example microfluidic device 100 of FIGS. 1A and 1B, each pillar 116 has a trailing corner 120 having an angle 202 that in general is less than the threshold angle. The angle 204 of the leading corner 118 of each pillar 116, by comparison, can be equal to, less than, or greater than the threshold angle. That is, there are no constraints on the angle 204 of the leading corner 118 of each pillar 116 to promote fluid flow, unlike the angle 202 of the trailing corner 120 of each pillar 116.

The angle 202 of the trailing corner 120 being equal to the threshold angle results in no or a neutral effect of the trailing corner 120 on fluid promotion. That is, if the angle 202 is equal to 20 degrees, the trailing corner 120 does not serve to pull fluid (in the case of water on SU-8 photoresist). The angle 202 of the trailing corner 120 being less than the threshold angle, by comparison, results in a positive or neutral effect of the trailing corner 120 on fluid promotion. That is, if the angle 202 is less than 20 degrees, the trailing corner 120 serves to pull fluid. However, the angle 202 of the trailing corner 120 being greater than the threshold angle results in a negative effect of the trailing corner 120 on fluid promotion. That is, if the angle 202 is greater than 20 degrees, the trailing corner 120 pushes instead of pulls fluid.

By comparison, the angle 204 of the leading corner 118 just affects the speed at which fluid advances past the pillar 116. At each point along the pillar 116 from either corner 206 or 208 and the leading corner 118, there is an instantaneous force that promotes fluid movement past the pillar 116. The smaller the angle 204 of the leading corner 118 is, the smaller the instantaneous force promoting fluid past the pillar 116. However, for a set distance between the side corners 206 and 208, the smaller the angle 204 of the leading corner 118 is, the longer the sides of the pillar 116 from the corners 206 and 208 to the corner 118 are. That is, even though the instantaneous force at any given point is smaller, there is a greater length over which the force is operative. When the angle 204 of the leading corner 118 is equal to two times the threshold angle, or 40 degrees, the overall force is maximized, resulting in the fastest speed at which fluid advances past the pillar.

Each pillar 116 of the microfluidic device 100 may have the same or different size, and/or the same or different shape. For instance, in the example of FIGS. 1A and 1B, the pillars 116 may have decreasing angles 202 at their trailing corners 120 in correspondence with how far away the rays 122 along which the pillars 116 are aligned are from the central ray 123. In such instance, the angle 202 of the trailing corner 120 of each pillar 116 is still less than the threshold angle, but decreases for the pillars 116 that are oriented more away from the central ray 123. In addition or instead, the pillars 116 may similarly have increasing angles 204 at their leading corners 118 in correspondence with how close the rays 122 along which the pillars 116 are aligned are to the central ray 123. In both of these examples, the net effect is to more aggressively promote fluid flow towards the corners 105 of the chamber 102 than between the inlet 108 and the outlet 110 where fluid more naturally flows.

The shape of the pillar 116 in both the examples of FIGS. 2A and 2B is a convex quadrilateral, which as noted is a four-sided polygon that has interior angles measuring less than 180 degrees each. The shape of the pillar 116 of FIG. 2A is specifically a diamond or rhombus, in which all four sides are of equal length. The diamond or rhombus is a special case of a kite shape, which is a convex quadrilateral in which two pairs of adjacent sides are of equal length. The shape of the pillar 116 of FIG. 2B is thus a kite that is not a diamond or a rhombus. However, in other implementations, the pillar 116 may have a shape that is a convex quadrilateral that is not a kite. In still other implementations, the pillar 116 may have a shape that is not a convex quadrilateral.

Figure 2C:
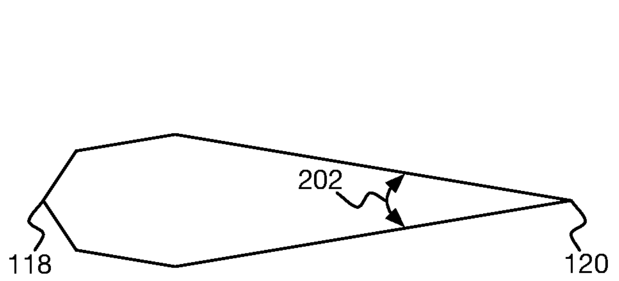

FIGS. 2C, 2D, 2E, 2F, and 2G show other examples of the chamber pillar 116 that may be used in the example microfluidic device 100. As in FIGS. 2A and 2B, the angle 202 of the trailing corner 120 of the pillar 116 in FIGS. 2C, 2D, 2E, 2F, and 2G is less than the threshold angle, or 20 degrees, to promote fluid flow (in the case of water on SU-8 photoresist). In FIG. 2C, the leading surface of the pillar 116 that is opposite the trailing corner 120 is a leading corner 118, as in FIGS. 2A and 2B. However, the pillar 116 is a convex six-sided polygon in shape in FIG. 2C, unlike in FIGS. 2A and 2B.

Figure 2D:
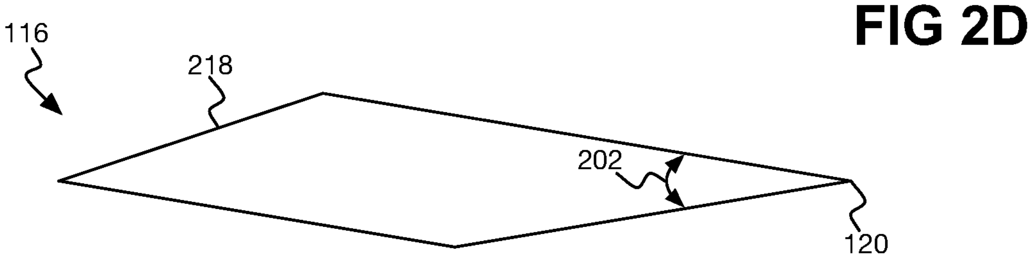
Figure 2E:
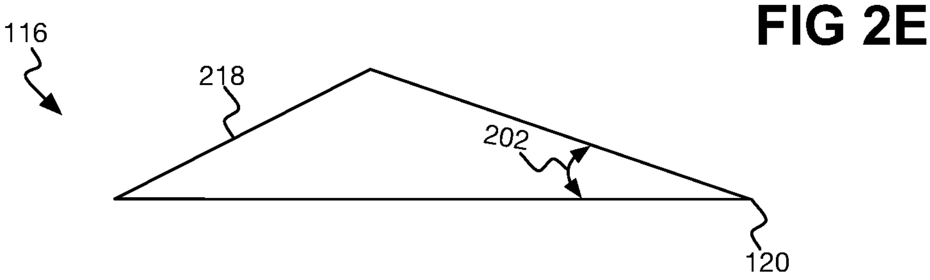
Figure 2F:
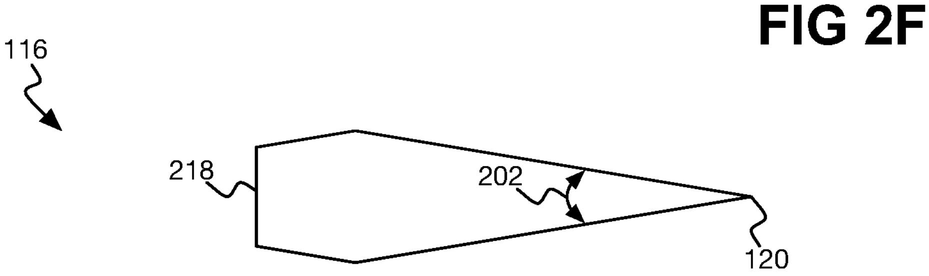
Figure 2G:
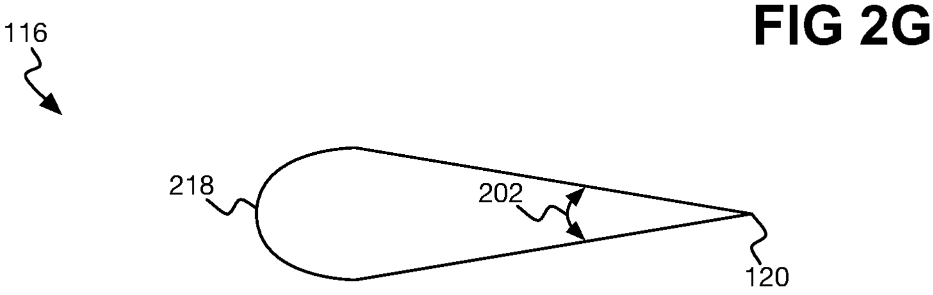

In FIGS. 2D, 2E, 2F, and 2G, by comparison, the pillar 116 has a leading surface 218 that is not a trailing corner. In general, the leading surface 218 of the pillar 116 can be defined as the surface that a ray extending from the trailing corner 120 and bisecting the angle 202 intersects. In FIGS. 2D, 2E, and 2F, the leading surface 218 is flat, whereas in FIG. 2G, the leading surface 218 is rounded or curved.

In FIGS. 2D, 2E, and 2F, the pillar 116 is polygonal in shape. In FIG. 2D, the pillar 116 is a convex quadrilateral in shape as in FIGS. 2A, and 2B, but is not a kite shape as in FIGS. 2A and 2B. In FIG. 2E, the pillar 116 is triangular in shape, whereas in FIG. 2F, the pillar 116 is a five-sided polygon in shape. By comparison, in FIG. 2G, the pillar 116 is non-polygonal in shape, since the leading surface 218 is rounded or curved.

Figure 3A:
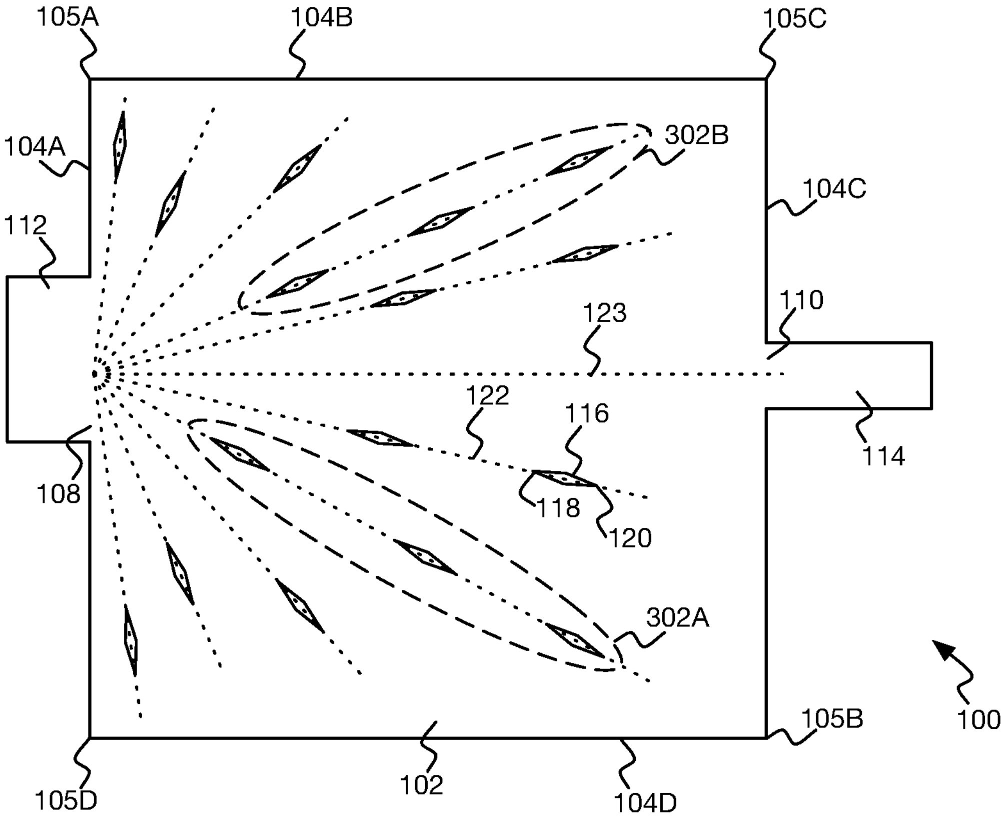
FIGS. 3A and 3B are cross-sectional top view diagrams of other example microfluidic devices that each have chamber pillars which promote fluid flow throughout the chamber.
Figure 3B:
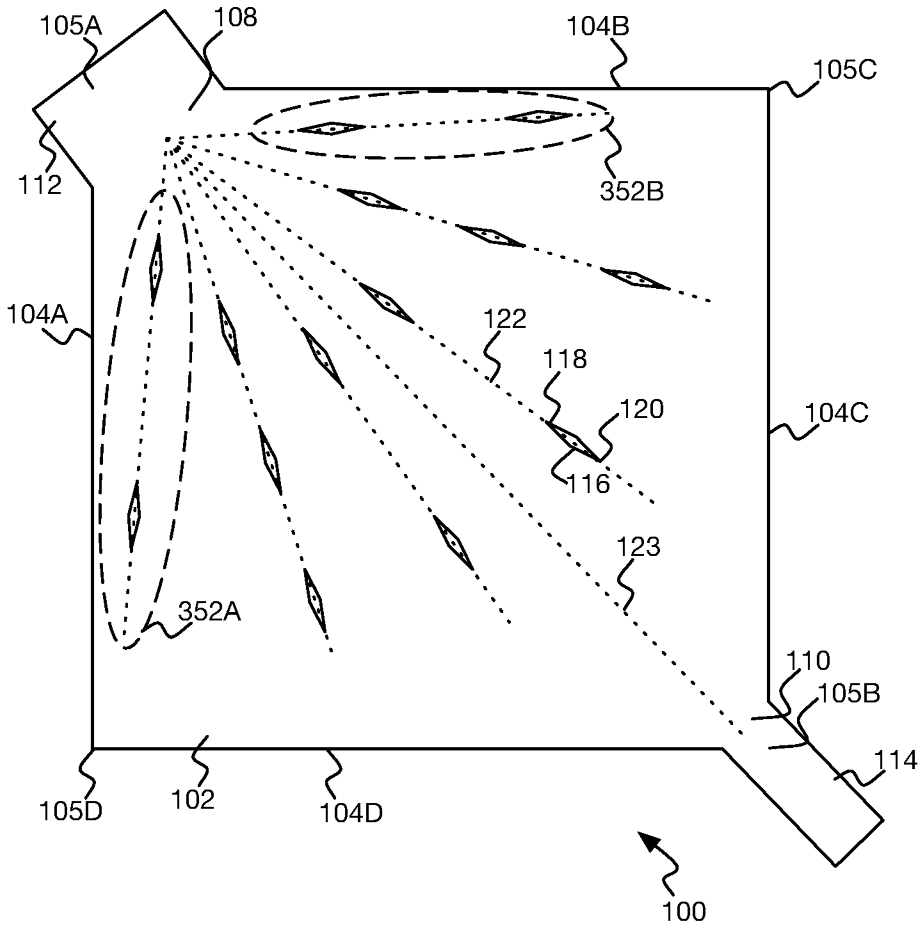

FIGS. 3A and 3B show other examples of the microfluidic device 100. The microfluidic device 100 again includes a chamber 102 having sidewalls 104 and corners 105, as well as an inlet 108 fluidically connected to a channel 112 and an outlet 110 fluidically connected to a channel 114 and positioned opposite the inlet 108. The microfluidic device 100 also includes pillars 116 that each have a leading corner 118 and an opposite, trailing corner 120, and that the orientations of which are configured to promote fluid flow throughout the chamber 102 from the inlet 108 to the outlet 110.

However, unlike in the example of FIGS. 1A and 1B, the inlet 108 and the outlet 110 in the examples of FIGS. 3A and 3B are not located at the bottom of the sidewall 104A and at the top of the sidewall 104C. Rather, in FIG. 3A, the inlet 108 is located in the middle of the sidewall 104A, and the outlet 110 is located in the middle of the opposing sidewall 104C. In FIG. 3B, the inlet 108 is located at the corner 105A at which the sidewalls 104A and 104B meet, and the outlet 110 is located at the corner 105B at which the sidewalls 104C and 104D meet.

The pillars 116 of the microfluidic device 100 are again each aligned along a corresponding ray 122 extending outwards from the inlet 108 in FIGS. 3A and 3B, except along the ray 123 that directly extends from the inlet 108 to the outlet 110. The pillars 116 thus promote fluid flow throughout the chamber 102 without trapping air or other gas at the sidewalls 104. The pillars 116 cause the fluid to more effectively fan out throughout the chamber 102 during priming.

In FIG. 3A, the pillars 116 within the subsets 302A and 302B, which are collectively referred to as the subsets 302, are aligned towards the corners 105C and 105B, respectively, to promote fluid flow from the inlet 108 towards these respective corners 105C and 105B. The sidewall 104C upwardly adjacent to the outlet 110 meets the sidewall 104B at the corner 105C, and the sidewall 104D downwardly adjacent to the outlet 110 meets the sidewall 104D at the corner 105B. In FIG. 3B, the pillars 352A and 352B, which are collectively referred to as the subsets 352, similarly are aligned towards the corners 105C and 105D, respectively, to promote fluid flow from the inlet 108 towards these respective corners 105C and 105D. The sidewall 104B adjacent to the inlet 108 meets the sidewall 104C at the corner 105C, and the sidewall 104A that is also adjacent to the inlet 108 meets the sidewall 104D at the corner 105D.

FIGS. 3A and 3B therefore show how the pillars 116 can be oriented relative to the inlet 108 in different configurations of the inlet 108 and the outlet 110 of the chamber 102 to promote fluid flow throughout the chamber 102 from the inlet 108 to the outlet 110. As in the example of FIG. 1A, in the examples of FIGS. 3A and 3B the orientations of the pillars are radially aligned with the inlet 108. Such a radial alignment has been shown to decrease if not eliminate the likelihood of air or other gas becoming trapped at the sidewalls 104 of the chamber 102 during priming.

Figure 4:
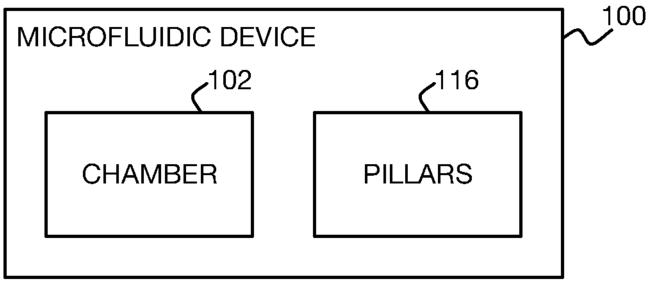
FIG. 4 is a block diagram of an example microfluidic device with chamber pillars that promote fluid flow throughout the chamber.

FIG. 4 shows a block diagram of the example microfluidic device 100 that has been described. The microfluidic device 100 includes the chamber 102 having sidewalls, a floor, a ceiling, and an inlet. The microfluidic device 100 includes pillars 116 that extending from the floor to the ceiling of the chamber 102. Each pillar 116 has a leading surface and a trailing corner opposite the leading surface. The trailing corner has an angle less than a threshold angle that is based on a fluidic contact angle.

Techniques have been described for promoting fluid flow throughout a microfluidic device chamber without trapping gas at the sidewalls of the chamber during priming. Specifically, the orientations pillars extending from the floor to the ceiling of the chamber relative to the inlet of the chamber are configured to promote fluid flow throughout the chamber without trapping gas at the chamber's sidewalls. The trailing corner of each pillar has an angle less than a threshold angle that is based on a fluidic contact angle. The resulting fluid promotion also ensures that fluid is not pinned at the inlet of the chamber during priming.

We claim:

1. A microfluidic device comprising:

a chamber having a plurality of sidewalls, a floor, a ceiling, and an inlet; and a plurality of pillars extending from the floor to the ceiling of the chamber, each pillar having an orientation relative to the inlet defined by a leading surface and a trailing corner opposite the leading surface, the trailing corner having an angle less than a threshold angle that is based on a fluidic contact angle, wherein the orientations of the pillars relative to the inlet are radially aligned with the inlet and promote fluid flow from the inlet throughout the chamber without trapping gas at the sidewalls of the chamber.

2. The microfluidic device of claim 1, wherein the threshold angle is equal to two times a difference between 90 degrees and the fluidic contact angle.

3. The microfluidic device of claim 1, wherein the threshold angle is 20 degrees.

4. The microfluidic device of claim 1, wherein, for each pillar, the leading surface is closer to the inlet than the trailing corner is.

5. The microfluidic device of claim 1, wherein the sidewalls of the chamber comprise a first sidewall adjacent to the inlet and a second sidewall meeting the first sidewall at a corner of the chamber, and wherein the orientations of a sub-plurality of pillars relative to the inlet are aligned towards the corner to promote fluid flow from the inlet towards the corner of the chamber.

6. The microfluidic device of claim 1, wherein the chamber further comprises an outlet opposite the inlet, and wherein the orientations of the pillars relative to the inlet promote fluid flow from the inlet to the outlet throughout the chamber without trapping gas at the sidewalls of the chamber.

7. The microfluidic device of claim 6, wherein the orientations of the pillars relative to the inlet are radially aligned with the inlet except along rays between the inlet and the outlet.

8. The microfluidic device of claim 6, wherein the sidewalls of the chamber comprise a first sidewall adjacent to the outlet and a second sidewall meeting the first sidewall at a corner of the chamber, and wherein the orientations of a sub-plurality of pillars relative to the inlet are aligned towards the corner to promote fluid flow from the towards the corner of the chamber.

9. The microfluidic device of claim 1, wherein the leading surface of each pillar comprises a leading corner having an angle equal to the threshold angle.

10. The microfluidic device of claim 1, wherein the leading surface of each pillar comprises a leading corner having an angle less the threshold angle.

11. The microfluidic device of claim 1, wherein the leading surface of each pillar comprises a leading corner having an angle equal to the angle of the trailing corner of each pillar.

12. A microfluidic device comprising:

a chamber having a plurality of sidewalls, a floor, a ceiling, and an inlet; and a plurality of pillars extending from the floor to the ceiling of the chamber, each pillar having a leading corner and a trailing corner opposite the leading corner, wherein for each pillar, the leading corner is closer to the inlet than the trailing corner is, and the trailing corner has an angle different than an angle of the leading corner and less than a threshold angle that is based on a fluidic contact angle and wherein each pillar has an orientation relative to the inlet defined by the leading corner and the trailing corner, and the orientations of the pillars relative to the inlet are radially aligned with the inlet and promote fluid flow from the inlet throughout the chamber without trapping gas at the sidewalls of the chamber.

13. The microfluidic device of claim 12, wherein the threshold angle is equal to two times a difference between 90 degrees and the fluidic contact angle.

* * * * *